United States Patent [19]

Hulyalkar

[11] Patent Number: 5,619,534
[45] Date of Patent: Apr. 8, 1997

[54] METHOD AND APPARATUS FOR REDUCING PRECODING LOSS WHEN USING A POST-COMB FILTERING APPROACH TO REDUCE CO-CHANNEL INTERFERENCE IN HIGH DEFINITION TELEVISION TRANSMISSION

[75] Inventor: Samir N. Hulyalkar, White Plains, N.Y.

[73] Assignee: Philips Electronics North America Corporatioin, New York, N.Y.

[21] Appl. No.: 420,891

[22] Filed: Apr. 11, 1995

Related U.S. Application Data

[63] Continuation of Ser. No. 170,471, Dec. 20, 1993, abandoned, which is a continuation-in-part of Ser. No. 60,181, May 7, 1993, abandoned.

[51] Int. Cl.[6] .............. H04L 5/12; H04L 23/02; H04B 15/00
[52] U.S. Cl. .............. 375/263; 375/285; 375/286; 375/346; 348/665
[58] Field of Search .............. 375/286, 290, 375/292, 296, 285, 346, 263, 264, 259; 348/21, 723, 725, 470, 665, 607, 608; 371/37.1, 37.5, 43; 341/56, 57

[56] References Cited

U.S. PATENT DOCUMENTS

| | | | |
|---|---|---|---|
| 4,833,693 | 5/1989 | Eyuboglu | 375/232 |
| 5,052,000 | 9/1991 | Wang et al. | 375/232 |
| 5,086,340 | 2/1992 | Citta et al. | 348/21 |
| 5,087,975 | 2/1992 | Citta et al. | 375/290 |
| 5,121,203 | 6/1992 | Citta | 348/665 |
| 5,263,051 | 11/1993 | Eyuboglu | 375/58 |
| 5,301,209 | 4/1994 | Wei | 375/39 |
| 5,311,547 | 5/1994 | Wei | 375/290 |
| 5,438,369 | 8/1995 | Citta et al. | 348/470 |

OTHER PUBLICATIONS

Advanced Digital Television, System Description, Jan. 20, 1992 Prepared by Savid Sarnoff Research Center & Philips Laboratories pp. 1–xvii and 1–130.
"Digital Spectrum Compatible—Technical Details" submitted to WP1 by Zenith and AT&T, Sep. 23, 1991.

*Primary Examiner*—Tesfaldet Bocure
*Attorney, Agent, or Firm*—Michael F. Marion

[57] ABSTRACT

A system for transmitting and receiving digital data which utilizes pre-coding at a transmitter, and selects post-coding at a receiver when co-channel interference not present or post-comb processing at the receiver when co-channel interference is present. The system includes a symbol interleaver at the transmitter and a symbol deinterleaver at the receiver which minimizes the byte errors by organizing the data input at the pre-coder at the transmitter such that the symbol errors and their respective propagated errors are re-organized so as to be disposed adjacent to each other, thereby forming adjacent symbol errors. The effect of this re-organization is to increase the probability that each pair of adjacent symbol errors correspond to bits which lie in the same byte.

3 Claims, 3 Drawing Sheets

METHOD AND APPARATUS FOR REDUCING PRECODING LOSS WHEN USING A POST-COMB FILTERING APPROACH TO REDUCE CO-CHANNEL INTERFERENCE IN HIGH DEFINITION TELEVISION TRANSMISSION

This is a continuation of application Ser. No. 08/170,471, filed Dec. 20, 1993 now abandoned.

Which application is a continuation in part of U.S. Ser. No. 08/060,181, filed May 7, 1993, now abandoned, the contents of which is incorporated by reference herein.

BACKGROUND OF THE INVENTION

The Federal Communications Commission and cable television testing organizations such as Cable Labs, have been evaluating digital television delivery systems in order to choose a new television "standard" which someday will replace NTSC in the United States. These systems all involve digital coding and data compression techniques, for example those utilizing the MPEG algorithms or variations thereof.

The FCC plans to test and approve an HDTV standard for terrestrial broadcasting in 1994. Although the specifics of the standard are yet to be fully tested and agreed upon, the FCC has indicated that the system will initially take the form of a so called "simulcast" approach. The new HDTV signals will have to fit into currently unused television channels (so-called "taboo" channels) and initially co-exist with conventional analog television signals without co-channel interference.

NTSC will be used hereinafter to represent one example of conventional television broadcasting. Other examples would be SECAM and PAL. Although NTSC is exemplified herein, it is not meant to be construed as a limitation and will be used herein synonomously with "conventional" to represent conventional television in general.

In 1994 the FCC will test the so-called "Grand Alliance" system, a system which was developed cooperatively by the corporate sponsors which developed the first round of individual proposals which were tested by the FCC in 1991 and 1992. This system proposes to take the best features from those systems already tested in order to present a single optimum system for FCC approval as the U.S. standard.

The Grand Alliance has already decided on a coding algorithm which will comply with the source and channel coding standards proposed by MPEG (Motion Picture Experts Group). In addition, two RF transmission schemes will be evaluated for best performance and the better of the two will be selected for inclusion in the Grand Alliance system.

The first system, which was proposed by the Advanced Television Research Consortium (ATRC), which included Grand Alliance members Philips Electronics, North America Corporation, David Sarnoff Research Laboratories and Thomson Electronics, is described in "Advanced Digital High Definition Television—System Specification", Jan. 20, 1992 which is incorporated by reference herein. The ATRC system features the use of quadrature amplitude modulation (QAM).

The second system, which was developed by Grand Alliance member Zenith Electronics, utilizes a multi-level vestigial sideband modulation approach and is discussed in U.S. Pat. Nos. 5,086,340 and 5,087,975 which are both incorporated by reference herein.

Co-channel interference between the conventional television transmission and the "simulcast" RDTV transmission could cause significant degradation in the performance of the HDTV transmission. Techniques have been proposed to alleviate this degradation in both of the proposed transmission systems.

In the Zenith approach, as described for example in "Digital Spectrum Compatible—Technical Details", submitted to WP1 by Zenith and AT&T, Sept. 23, 1991 and U.S. Pat. No. 5,121,203 which are incorporated by reference herein, a comb filter is used in the receiver to introduce nulls in the digital spectrum at the locations of the picture, color and the sound carriers. This provides a significant improvement in performance when conventional television, e.g. NTSC, is broadcast on a co-channel.

To implement such a comb filter, it is necessary that the data at the HDTV transmitter be pre-coded. This pre-coding is required to eliminate error propagation and is related to the post-comb used in the receiver, in a unique way. For example, to reduce co-channel NTSC interference, it is preferable to use a comb-filter with a delay element of 12 symbol intervals in the post-comb, although other delays can also be used as described in the '975 patent. For a delay of 12 symbols in the post-comb, it is necessary to have a delay element of exactly 12 symbols in the pre-coder as well. In general, the pre-coder for a given post-comb can be designed as explained in the references cited above.

When co-channel NTSC is not present however, the use of a post-comb at the HDTV receiver can cause a loss in error performance (e.g. 3 dB) when only additive white Gaussian noise (AWGN) is present. This is discussed in the '340 patent. Hence, an alternate path is provided at the receiver for the case when the co-channel NTSC is not present. This alternate path performs a post-coding operation, which is simply the inverse of the precoding operation at the transmitter. The path selected depends upon the measured error-rate of the periodically sent data field sync symbols at the outputs of both the post-coder and the post-comb paths. Whichever error is smallest at the end of a preset period determines whether the post-coder or post-comb is active.

A problem exists however in that when pre-coding and postcoding operations are implemented as discussed in the references, a single symbol error will cause an additional symbol error to occur which will be referred to hereinafter as "propagated symbol error". Furthermore, when the pre-coding and post-coding operations are used with a delay, for example of twelve symbol intervals, then each symbol error and its corresponding propagated error are spread twelve symbols apart.

Each symbol is created by mapping a group of bits on to a constellation. For example, two bits are required to select a symbol in a four VSB constellation as used in the Zenith system. As discussed above, a single symbol error cause a propagated symbol error to appear twelve symbols later which will result in two byte errors due to the error propagation of the single symbol error.

Since the outer RS (Reed-Soloman) decoder used in the Zenith system processes information as bytes, the resulting byte errors produces a 0.75 dB of loss in ultimate performance.

The object of the invention is to minimize the byte errors caused by a single symbol error and thus improve the performance of an HDTV television system which uses the pre-coding/post-comb method for minimizing co-channel NTSC interference.

SUMMARY OF THE INVENTION

The invention minimizes the byte errors by organizing the data input at the pre-coder at the transmitter such that the symbol errors and their respective propagated errors are re-organized so as to be disposed adjacent to each other, thereby forming adjacent symbol errors. The effect of this re-organization is to increase the probability that each pair of adjacent symbol errors correspond to bits which lie in the same byte. For example for four VSB with only two bits of information per information symbol, as a result of the invention, the adjacent symbol errors which result from the pre-coding/postcoding operations are likely to be part of the same eight bit byte. Thus in most cases, for each symbol error only one byte of information would be lost. For the four VSB example, the adjacent symbol errors each cause only 1.25 byte errors on an average and thus improves the performance by 0.5 dB.

A feature of the embodiment of the invention described herein is to achieve organization of the symbol errors and corresponding propagated errors into adjacent symbol errors by implementing a symbol-by-symbol block interleaver after the cascade of a RS encoder and a byte interleaver at the transmitter. After the post-coder at the receiver, a symbol-by-symbol block deinterleaver will be used, which will be followed by the byte deinterleaver and an RS decoder. The size of the block symbol-by-symbol interleaver must be equal to the largest delay in the pre-coder.

DETAILED DESCRIPTION OF PREFERRED EMBODIMENTS OF THE INVENTION

Figure 1:
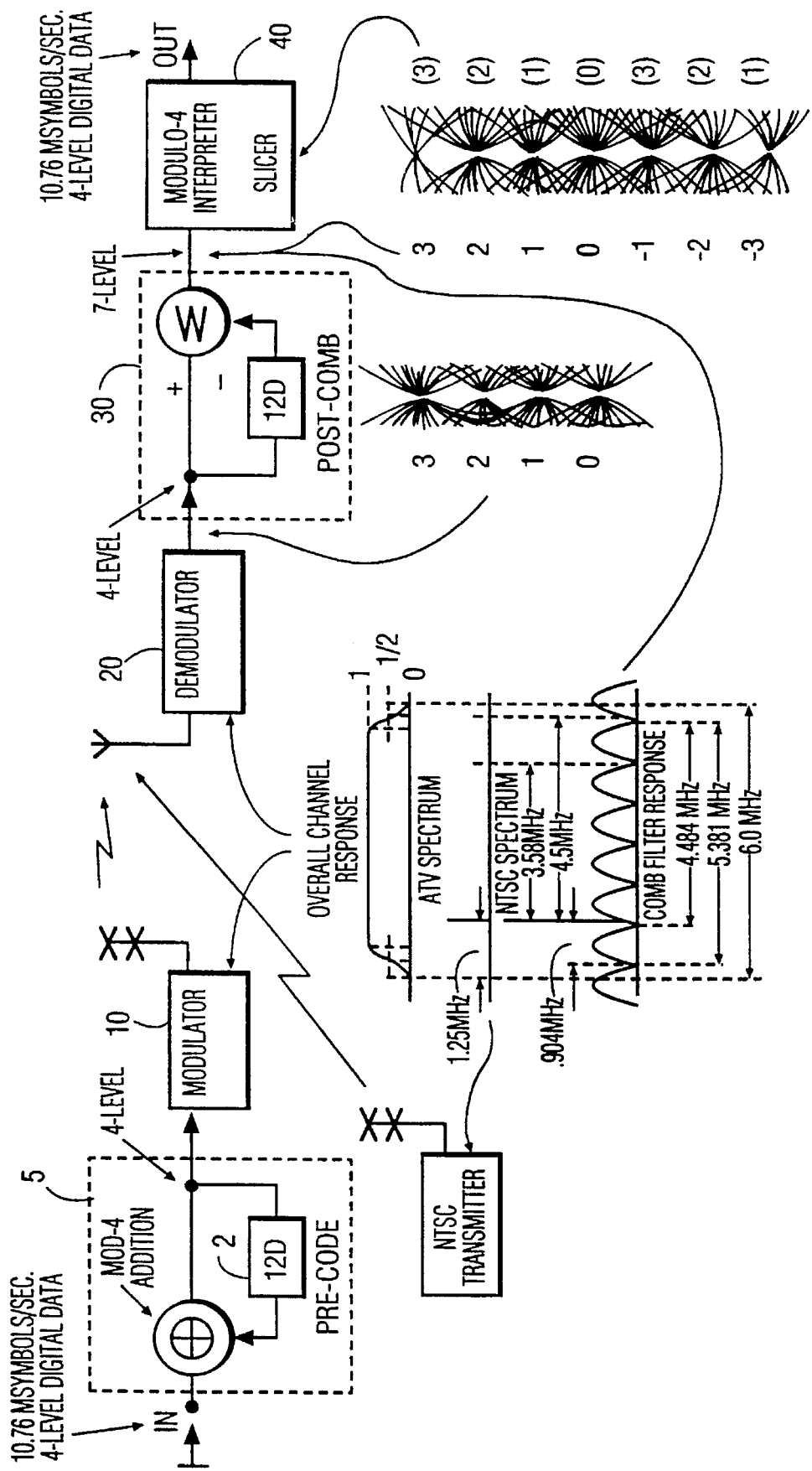
FIG. 1 describes the prior art Zenith four VSB modulation/demodulation system including the pre-coder and post-comb.

FIG. 1 describes the prior art four VSB modulation/demodulation system discussed in "Digital Spectrum Compatible—Technical Details", submitted to WP1 by Zenith and AT&T, Sept. 23, 1991 ("Zenith reference"). As illustrated, the four level digital data is precoded and then passed through a VSB modulator 10. The signal is transmitted over a channel and received by a demodulator 20 as shown. The details of the modulator, demodulator, which includes IF to RF conversion and back and also the equalizer, and timing and carrier recovery at the receiver, can be found in the references incorporated herein.

The demodulator 20 is followed by a post-comb filter 30, which has a frequency response as indicated on FIG. 1. The comb filter response is effective in eliminating the co-channel NTSC picture, chroma and the audio carriers. At the output of the post-comb filter 30, the four-level signal is converted into a seven-level signal, which must be appropriately sliced and interpreted in interpreter/slicer 40 to provide a four-level decision. The method of interpretation and slicing is explained in the Zenith references, including the '340 and '975 patents incorporated herein.

When co-channel NTSC is not present, it is not desirable to implement the comb filter 30 since it enhances the noise at the receiver. As described in the '340 patent and Zenith reference (but not shown in FIG. 1), a post-coder is used after demodulator 20, which performs the inverse operation of the pre-coder 5. Also not shown are the forward-error correction (FEC) circuit, which is a RS encoder/decoder and a byte interleaver/deinterleaver.

Figure 2:
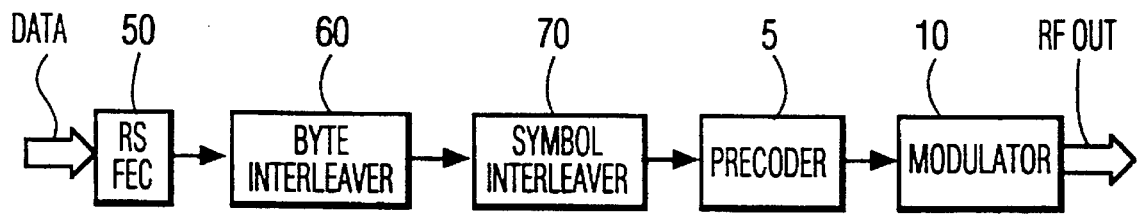
FIG. 2 describes a transmitter comprising the invention.

FIG. 2 describes a transmitter comprising the invention which includes a RS FEC 50, a byte interleaver 60, a pre-coder 5 and VSB modulator 10 as described in the Zenith reference, and in addition adds a symbol interleaver 70 between the byte interleaver 60 and the pre-coder 5.

The symbol interleaver 70 can be a block interleaver as described for example, in the book "Digital Communications", by J. G. Proakis (McGraw Hill, 1989) which operates on two-bit symbols for four VSB. The size of the symbol interleaver 70 is 12×12, where the number 12 is chosen to be equal to the delay block 2 in the pre-coder 5.

As described in the Zenith reference, the byte interleaver 60 permutates the input byte sequence provided by RS FEC 50 so as to provide a byte interleaved sequence of bytes. This byte interleaved sequence can be interpreted as a symbol sequence which is then permutated by 12×12 symbol interleaver 70 so as to form a symbol interleaved sequence of symbols which is then pre-coded and modulated as described above.

Figure 3:
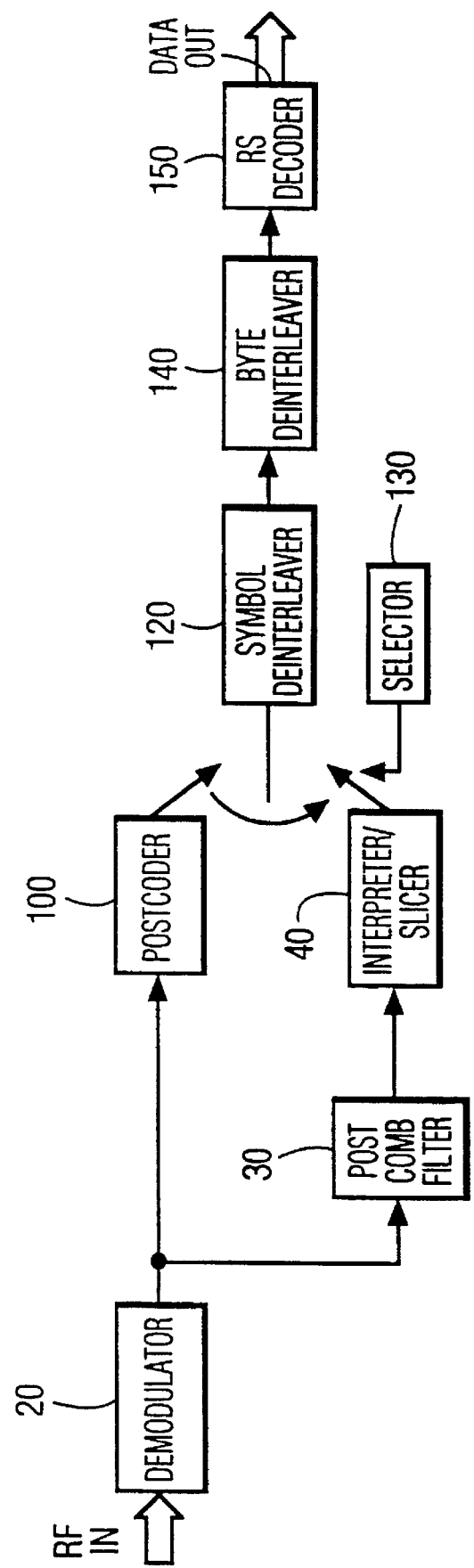
FIG. 3 describes a receiver comprising the invention.

FIG. 3 describes one embodiment of a receiver comprising the invention. The selection control 130 is a switch which is used (as described in the Zenith reference) to select comb filter 30 to remove co-channel NTSC interference when present.

The symbol interleaved sequence of symbols is demodulated in demodulator 20. When co-channel interference is not present, selection control 130 selects post-coder 100 as the input to symbol deinterleaver 120 and when co-channel interference is presented selection control 130 selects the post-comb filter 30 and the interpreter/slicer 40 as the input to symbol deinterleaver 120. A symbol error can occur between a symbol as it appears at the corresponding output of pre-coder 5 and the symbol as corrupted by the channel. Because both the postcoding and the postcombing use the received symbol again twelve symbols later in their processes, as described in the Zenith reference, a second symbol error will occur twelve symbols later.

By using the 12×12 symbol interleaver 70 to re-organize the interleaved byte sequence into an interleaved symbol sequence, symbol errors and their corresponding propagated errors which occur during the pre-coding and post-coding operations following the symbol interleaving will be disposed adjacent to each other in most cases after 12×12 symbol deinterleaver 120.

In the case where co-channel interference is present and selection control 130 chooses the output of interpreter/slicer 40 as the input to symbol deinterleaver 120, no post-coding takes place and the re-organizing of symbols by the symbol deinterleaver cause no loss in performance.

Numerous alterations of structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit and scope of the invention are intended to be included within the scope of the following claims.

I claim:

1. A transmitter for transmitting digital data, the transmitter comprising:

a) a byte interleaver for coding an input byte sequence into a symbol sequence;

b) a symbol interleaver having a symbol interleaving depth, coupled to said byte interleaver, for interleaving said symbol sequence on a symbol by symbol basis to provide a symbol interleaved digital signal;

c) means for delaying the symbol interleaved digital signal by a delay interval so as to produce a delayed interleaved digital signal, said delay interval and the symbol interleaving depth of said symbol interleaver being equal; and d) a precoding filter for performing a first finite field arithmetic process using the interleaved digital signal and the delayed interleaved digital signal to produce a precoded digital signal.

2. A receiver, for producing the digital data from the digital signal transmitted by the transmitter of claim 1, the receiver comprising:

means for receiving said precoded digital signal;

a post-comb filter comprising means for delaying said precoded digital signal by said delay interval so as to produce a delayed precoded digital signal, wherein said post-comb filter post-comb filters the precoded digital signal using the precoded digital signal and the delayed precoded digital signal so as to produce a post-combed digital signal;

means for performing a second finite field arithmetic process upon the post-combed digital signal to restore the symbol interleaved digital signal; and a symbol deinterleaver for deinterleaving the symbol interleaved digital signal to restore the digital data.

3. The receiver as claimed in claim 2, said receiver further comprising:

means for performing a third finite field arithmetic process upon the precoded digital signal to complement the first finite field arithmetic process and to restore the symbol interleaved digital signal; and switching means for alternatively coupling the digital data via either said post-comb filter and said means for performing the second finite field arithmetic operation or via said means for performing the third finite field arithmetic process.

* * * * *